United States Patent
Mauchle et al.

(10) Patent No.: US 9,486,827 B2
(45) Date of Patent: Nov. 8, 2016

(54) JET-RECEIVING NOZZLE FOR A POWDER-DELIVERY INJECTOR PLUS POWDER-DELIVERY INJECTOR

(75) Inventors: Felix Mauchle, Abtwil (CH); Marco Sanwald, Abtwil (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 684 days.

(21) Appl. No.: 13/807,492

(22) PCT Filed: Jun. 29, 2011

(86) PCT No.: PCT/US2011/042270
§ 371 (c)(1),
(2), (4) Date: Dec. 28, 2012

(87) PCT Pub. No.: WO2012/003194
PCT Pub. Date: Jan. 5, 2012

(65) Prior Publication Data
US 2013/0099026 A1    Apr. 25, 2013

(30) Foreign Application Priority Data
Jun. 30, 2010 (DE) .................. 10 2010 030 761

(51) Int. Cl.
*B05B 15/06* (2006.01)
*B05B 7/14* (2006.01)
*B65G 53/42* (2006.01)

(52) U.S. Cl.
CPC ........... *B05B 15/065* (2013.01); *B05B 7/1404* (2013.01); *B05B 7/1472* (2013.01); *B65G 53/42* (2013.01)

(58) Field of Classification Search
CPC ............ B05B 1/02; B05B 1/06; B05B 7/14; B05B 15/06; B05B 5/065; B05B 7/1404; B05B 7/1472; B65G 53/34; B65G 53/40; B65G 53/42
USPC ......................... 239/592–595, 597–599, 601
See application file for complete search history.

(56) References Cited

U.S. PATENT DOCUMENTS

| | | | | |
|---|---|---|---|---|
| 1,239,373 A | * | 9/1917 | Farmer et al. .......... | B05B 1/042 239/594 |
| 4,097,872 A | * | 6/1978 | Giordano .................. | B41J 2/02 239/299 |
| 2006/0038044 A1 | | 2/2006 | Van Steenkiste et al. | |
| 2006/0138252 A1 | | 6/2006 | Keudell et al. | |

FOREIGN PATENT DOCUMENTS

| | | |
|---|---|---|
| CN | 1739864 A | 3/2006 |
| CN | 201010365 Y | 1/2008 |
| CN | 201027713 Y | 2/2008 |
| CN | 201092484 Y | 7/2008 |
| CN | 201288708 Y | 8/2009 |
| DE | 202004019438 U1 | 2/2005 |
| EP | 0629451 A1 | 12/1994 |

OTHER PUBLICATIONS

An International Search Report and Written Opinion corresponding to PCT/US2011/042270, dated Oct. 13, 2011.

* cited by examiner

*Primary Examiner* — Christopher Kim
(74) *Attorney, Agent, or Firm* — Kinney & Lange, P.A.

(57) ABSTRACT

The invention relates to a jet-receiving nozzle for a powder-delivery injector with an arresting region on the injector side and a connecting region remote from the injector, the arresting region having a configuration preventing incorrect connection. The invention also relates to a powder-delivery injector for delivering a powder-air mixture, the powder-delivery injector having an accepting channel for accepting a jet-receiving nozzle.

16 Claims, 5 Drawing Sheets

Figure 1:
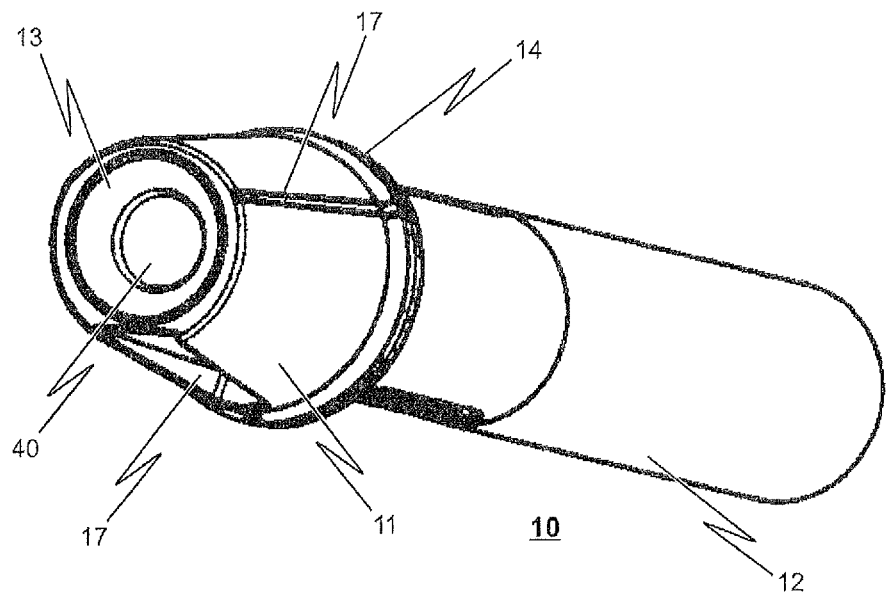
Figure 2:
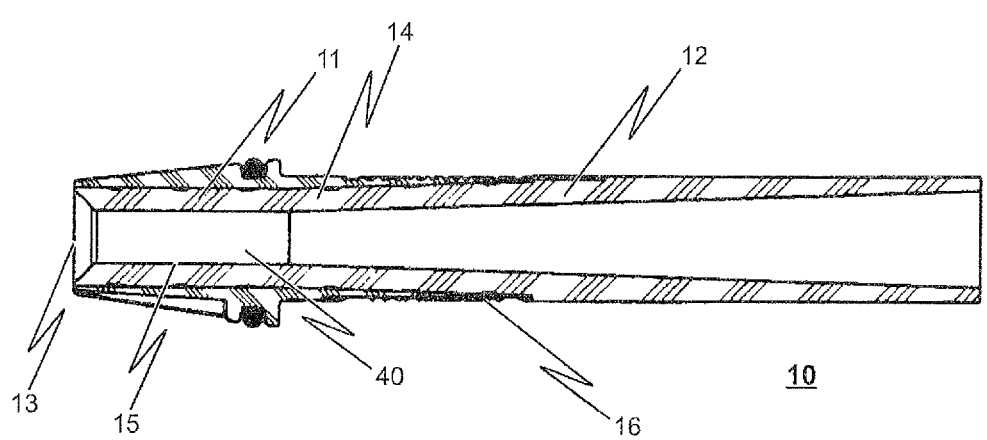
Figure 3:
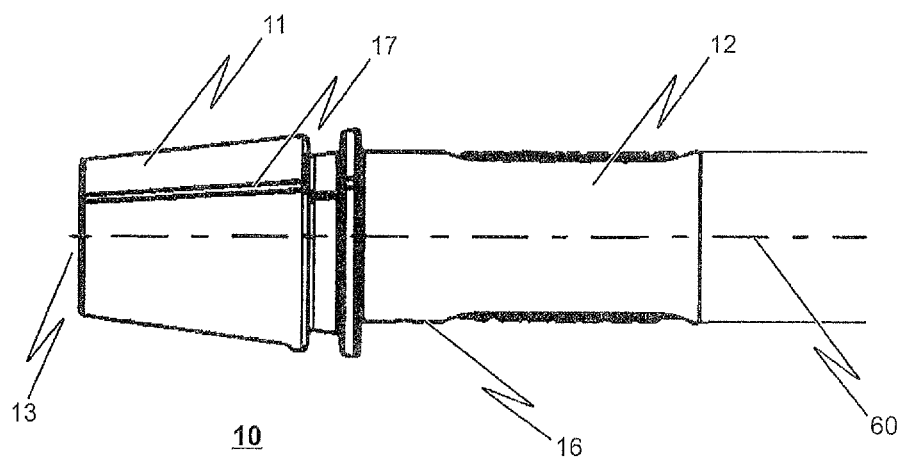

JET-RECEIVING NOZZLE FOR A POWDER-DELIVERY INJECTOR PLUS POWDER-DELIVERY INJECTOR

RELATED APPLICATIONS

The present application is National Phase of International Application Number PCT/US2011/042270, filed Jun. 29, 2011, and claims priority from, German Application Number 102010030761.0, filed Jun. 30, 2010.

The invention relates to a jet-receiving nozzle for a powder-delivery injector according to the preamble of claim 1 plus a powder-delivery injector for delivering a powder-air mixture according to the preamble of claim 5.

Jet-receiving nozzles of the abovementioned type are used in powder-delivery injectors which convey coating powder, which is fluidized with the aid of conveyor air, from a storage hopper using the "Venturi" effect and conduct said coating powder through the jet-receiving nozzle, which is inserted into said injectors, via, for example, a powder supply hose to a coating gun. For this purpose, the interior of the jet-receiving nozzles, which are formed as elongate hollow bodies, forms a "jet-receiving" channel into which the fluidized and conveyed powder-air mixture is introduced. After the jet-receiving nozzle has been inserted into the injector, the jet-receiving channel lies in the axial direction opposite a delivery-jet nozzle through which conveying air is pressed into the jet-receiving nozzle. A high-velocity air stream is formed because of the relatively small diameter of the delivery-jet nozzle, as a result of which a negative pressure is formed in a directly adjacent powder supply channel which is connected to the hopper. Owing to the negative pressure, fluidized coating powder is conveyed out of the powder hopper in the powder supply channel toward the jet-receiving nozzle and is conducted through the latter to the powder discharge hose. A powder-delivery injector of this type with a jet-receiving nozzle of this type is known, for example, from German laid-open application DE 198 24 802 A1.

The abrasive effect of the coating powder which is conducted through the jet-receiving nozzle at high velocity causes the known jet-receiving nozzles to be subject to a relatively high degree of wear, which is generally noticeable by the abrasion of material leading to widening of the jet-receiving channel, resulting in a drop in pressure. More and more conveying air is required as a result over time for conveying the coating powder, this firstly being uneconomical and secondly may also result in unsatisfactory coating results due to nonuniform powder clouds.

For this reason, known jet-receiving nozzles of this type have to be exchanged relatively frequently.

For different types of coating powder, use is frequently also made of various different powder-delivery injectors which are coordinated to the particular type of coating powder used and into which jet-receiving nozzles in turn adapted to the coating powder to be used in each case are inserted. The known jet-receiving nozzles have the disadvantage that even jet-receiving nozzles which may not be coordinated with the particular powder-delivery injector can be inserted into the injector, this leading to the coating powder not being optimally introduced into the jet-receiving channel. As a result, the coating result is also adversely affected at the same time if, for example, some of the air or powder stream is conducted past the jet-receiving nozzle due to a non-matching jet-receiving nozzle being inserted. Similarly, due to the insertion of non-matching jet-receiving nozzles into the powder-delivery injector, channel diameters of the jet-receiving channel that are not adapted to the particular coating powder lead to an unsatisfactory powder-delivery and coating result.

The invention is intended to achieve the object of creating an option to ensure, upon routine or defect-necessitated exchanging of the jet-receiving nozzle, that, for the exchange, only a matching jet-receiving nozzle can be inserted into the powder-delivery injector.

This object is achieved according to the invention in that the jet-receiving nozzle which is designed as a hollow body has an arresting region which widens in an obliquely conical manner from an inlet end, into which the coating powder is introduced, in the direction of the conveyed powder stream.

The advantage obtained by the invention is that only jet-receiving nozzles which are adapted to the particular powder-delivery injector can be inserted into the latter, this permitting optimum adaptation of the cooperation between the powder injector and jet-receiving nozzle, in particular with regard to opening and channel diameters which are coordinated with each other. The coating result is optimized by this procedure. Should it be necessary to exchange the jet-receiving nozzle, the further advantage is obtained in this case that just by means of the obliquely conical widening, visual allocation of the correct jet-receiving nozzle to the powder-delivery injector in each case matched thereto can be undertaken. As a result, in the event of a change being necessary and there being a plurality of similar jet-receiving nozzles, the exchange time is considerably shortened, which leads to a more rapid resumption of the coating process by the user and, as a result, to a saving on time and cost.

According to a first exemplary embodiment of the present invention, the arresting region widens in an obliquely conical manner such that the center point of an inner sectional circle, obtained through a section taken perpendicularly, in the end region of the jet-receiving nozzle according to the invention coincides with the center point of an outer sectional circle. In this case, the inner sectional circle describes the delimiting of the sectioned inner jet-receiving channel, wherein the outer sectional circle delimits the outer cross-sectional area of the body. The end region is understood as being the region into which the powder-air mixture is introduced when the jet-receiving nozzle according to the invention is used in a powder-delivery injector.

Said center points in turn do not coincide in a transitional region of the jet-receiving nozzle that opens out into the connecting region of the powder outlet hose. In said transitional region, the arresting region has a larger outside diameter than at the end region, wherein the outside diameter is described precisely by the outer sectional circle in the sectional drawing which is explained by way of example. Owing to the fact that the center points no longer coincide in said region, the part of the jet-receiving nozzle in the arresting region consequently has an oblique truncated circular cone, in the interior of which a jet-receiving channel pointing in the direction of the powder to be conveyed is formed.

According to a further embodiment of the invention, at least one guiding element is provided along the arresting region which widens in an obliquely conical manner. Said guiding element may be in the form of a groove or slot that may also be designed as a rail, and may assist the guiding of the jet-receiving nozzle according to the invention in an accepting channel of a powder-delivery injector such that the jet-receiving nozzle is guided in the accepting region largely in a straight line and, in addition, in a manner secure against rotation with little mechanical play.

In addition, it is possible to provide the outer surface of the jet-receiving nozzle according to the invention with a conductive coating or to design said outer surface as a conductive surface. In particular, electrostatic charges, which are sometimes undesirable, of the coating powder rubbing along the inside of the jet-receiving channel can be avoided if the dissipation resistance of said conductive coating is of sufficiently small dimensions. A dissipation resistance of the coating or of the conductive surface of less than 1 MΩ is preferably provided in order to ensure that the electrostatic charge is dissipated to ground along the surface.

As an alternative or in addition, it is also possible to provide the outer surface of the jet-receiving nozzle according to the invention with encircling engaging grooves, i.e. encircling depressions. A conductive coating can be or can have been provided on said depressions, the depressions or engaging grooves ensuring that the conductive coating can be securely fastened or connected to the surface. One conductive coating mentioned can in particular contain Teflon.

Figure 4A:
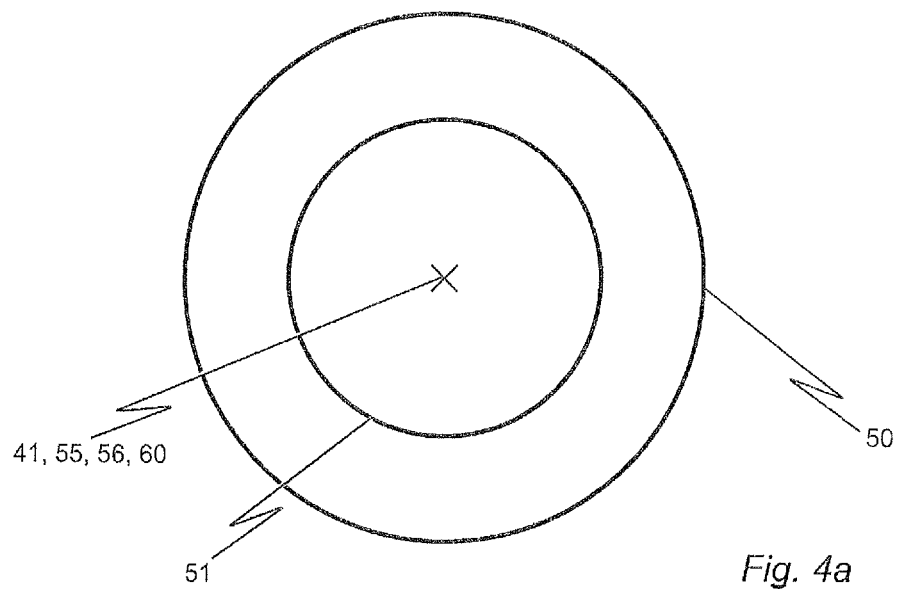
Figure 4B:
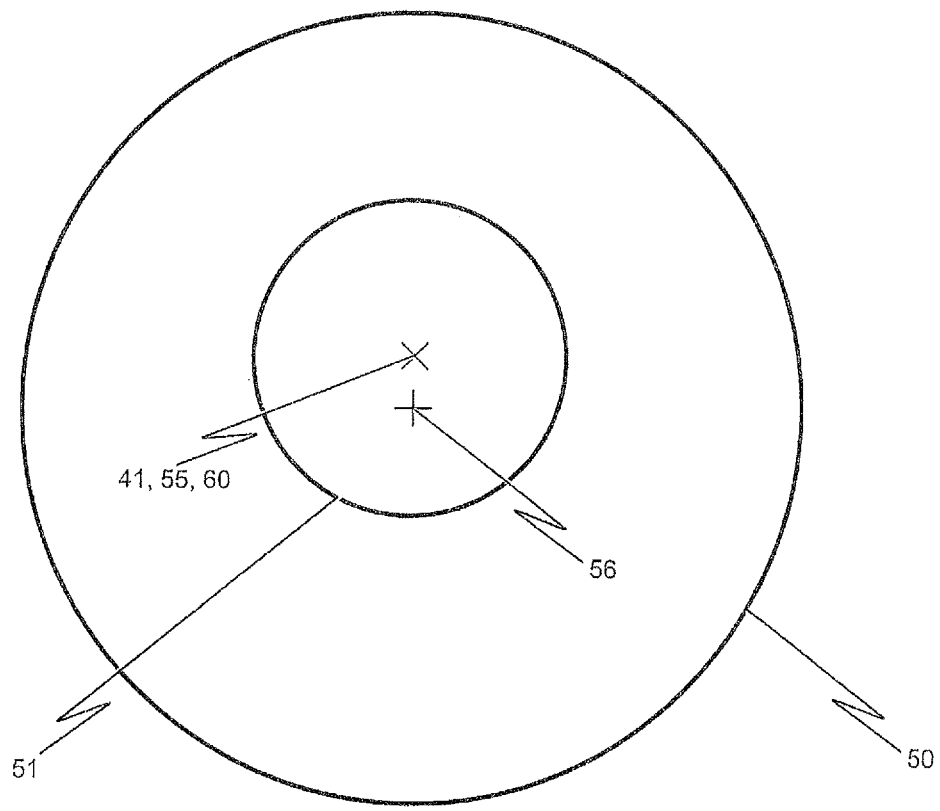

Furthermore, the jet-receiving nozzle according to the invention can particularly advantageously be used in a powder-delivery injector, which is correspondingly equipped in order to accept the jet-receiving nozzle having the arresting region which widens in an obliquely conical manner. Such a powder-delivery injector for delivering a powder-air mixture has an accepting channel for accepting the jet-receiving nozzle, said accepting channel being formed so as to complement the arresting region of the jet-receiving nozzle, i.e. widens in a likewise obliquely conically matching manner. In this case, i.e. in a region of the accepting channel that accepts the inlet end of the jet-receiving nozzle, the center point of a sectional circle coincides with a delivery axis extending in the powder-delivery direction. The sectional circle here describes the delimiting of a cross-sectional area of the accepting channel in a section taken perpendicularly with respect to the delivery axis through the accepting channel.

In a particularly preferred manner, the main axis of the jet-receiving nozzle and the delivery axis, which extends in the powder-delivery direction, of the powder-delivery injector coincide. By this means, even when the accepting channel and the arresting region widen in an obliquely conical manner, it is ensured that, when the arresting region is in engagement with the accepting channel, the coating powder is conducted through the jet-receiving channel largely in a straight line. Accordingly, said construction does not result in any disadvantageous additional friction of the coating powder in comparison to conventional jet-receiving nozzles.

According to a further preferred exemplary embodiment, the powder-delivery jet injector has a powder supply channel which is connected to the hopper, the powder supply channel extending at an obtuse angle in relation to the delivery axis. The obtuse angle is particularly preferably approximately 45°. The angle is described in this case by the powder supply channel and that part of the delivery axis which extends from the opening-out point of the powder supply channel in the direction of the accepting channel.

This gives rise to the advantage that, in comparison to the conventional powder-delivery jet injectors, the powder supply channels of which extend at an angle of approximately 90° in relation to the delivery axis, an improved delivery capacity of the coating powder is obtained with the quantity of conveying air being the same and with the same negative pressure, which is produced by the stream of conveying air, in the powder supply channel.

Further features of the invention are indicated in the dependent claims.

The invention is described below with reference to the drawings, in which:

FIG. 1 shows a perspective view of a jet-receiving nozzle according to the invention for a powder-delivery injector;

FIG. 2 shows a sectional view of the jet-receiving nozzle according to the invention according to FIG. 1;

FIG. 3 shows a side view of the jet-receiving nozzle according to the invention according to FIG. 1;

FIG. 4*a* shows the schematic drawing of a sectional view of the jet-receiving nozzle according to the invention at an inlet end of an arresting region;

FIG. 4*b* shows the schematic drawing of a sectional view of the jet-receiving nozzle according to the invention in a transitional region of the arresting region;

FIG. 5 shows the sectional view of a powder-delivery injector for accepting a jet-receiving nozzle according to the invention;

FIG. 6*a* shows the schematic drawing of a sectional view of a powder-delivery injector according to FIG. 5 in a first channel region;

FIG. 6*b* shows the schematic drawing of a sectional view of a powder-delivery injector according to FIG. 5 in a second channel region.

The jet-receiving nozzle 10 shown in FIG. 1 has a connecting region 12 for the connection of a powder discharge tube through which the coating powder introduced after the fluidizing and introducing operation is supplied, for example, to a coating device, such as a spray gun. The connecting region 12 is adjoined by an arresting region 11 which tapers in an obliquely conical manner in the transitional part from the connecting region 12 to its inlet end 13. It can be seen at the inlet end 13 that a jet-receiving channel 40 is delimited by the jet-receiving nozzle 10 which is formed as a hollow body.

It can be seen in the sectional drawing shown in FIG. 2 that the jet-receiving nozzle 10 has an inner surface 15 and an outer surface 16, wherein the inner surface 15 delimits the jet-receiving channel 40.

As can be seen in the side view according to FIG. 3, the jet-receiving channel 40 of the jet-receiving nozzle 10 has a main axis 60 which constitutes the center point of the powder delivery path. A guiding element 17, which can be designed as a groove or slot, but also as a rail or the like, is in engagement, upon insertion into a powder-delivery injector which is suitable for accepting a jet-receiving nozzle of this type, with guiding elements which are formed there so as to complement it. Accordingly, the guiding elements in an accepting channel of the powder-delivery injector can be formed in a complementary manner as a rail, groove, slot or the like.

It is shown in FIG. 4*a* that, in a section taken perpendicularly with respect to the axial direction, the axial center point 41 of said jet-receiving channel 40 coincides with the main axis 60. Also illustrated is an outer sectional circle 50 which delimits the cross-sectional area of the jet-receiving nozzle body on the outside thereof. In addition, an inner sectional circle 51 is depicted which, for its part, delimits the cross-sectional area of the jet-receiving nozzle body toward the jet-receiving channel 40. In a section at the inlet end 13, as illustrated in FIG. 4*a*, the respective circle center points 55, 56 of the outer sectional circle 50 and of the inner sectional circle 51 coincide with one another and with the axial center point 41 of the jet-receiving channel 40 and of the main axis 60.

In the orthogonal section, which is carried out with respect to the direction of the main axis 60, in a transitional region 14 of the arresting region 11, it can now be seen, as shown in FIG. 4b, that with the diameter of the jet-receiving channel 40, which is described by the inner sectional circle 51, remaining approximately the same, the arresting region 11 has widened, which can be seen by way of the enlarged diameter of the outer sectional circle 50. Furthermore, the circle center point 55 of the inner sectional circle 51 coincides with the axial center point 41 of the jet-receiving channel 40. The main axis 60 furthermore extends through said common center point 41, 55. In contrast, the center point 56 of the outer sectional circle 50 is displaced to the effect that said center point not only no longer coincides with the center point 55 of the inner sectional circle 51 but also that the main axis 60 no longer extends through said center point 56 of the outer sectional circle 50.

Figure 5:
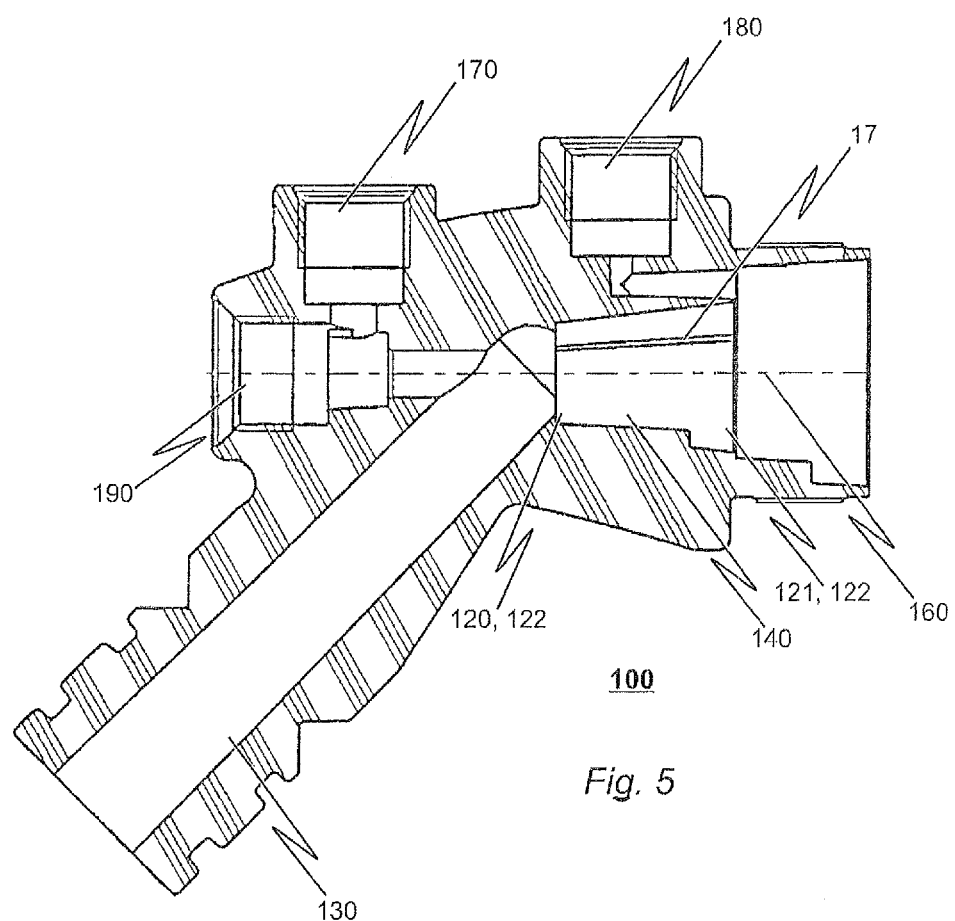

The powder-delivery injector 100 illustrated in FIG. 5 serves to accept a jet-receiving nozzle 10 according to the invention. For this purpose, the powder-delivery injector 100 has an accepting channel 140 into which the jet-receiving nozzle 10 is inserted. An insert opening 190 permits the insertion of a delivery-jet nozzle, wherein such a delivery-jet nozzle (not shown) is arranged axially at an axial distance from the jet-receiving nozzle 10 according to the invention. Conveying air is introduced through a connection 170 into the delivery-jet nozzle, as a result of which a negative pressure is formed in a powder supply channel 130. By this means, coating powder is sucked out of a hopper (not shown) through the powder supply channel 130 and conducted by the stream of conveying air into the jet-receiving channel 40. The coating powder to be conveyed is already in fluidized form in the hopper, optionally by means of fluidizing processes carried out at the same time. A further connection 180 serves for the optional metering in of metering air.

The accepting channel 140 has an accepting region 122 which, in turn, is divided into a first channel region 120 and a second channel region 121. The first channel region 120 opens out into the powder supply channel and produces the connection to the latter. The second channel region 121 lies downstream with respect to the powder delivery direction, i.e. opens out into an output.

After the powder supply channel 130 has opened out into the first channel region 120, the powder is conveyed by the powder-delivery injector 100 along an imaginary delivery axis 160. After a jet-receiving nozzle 10 according to the invention has been inserted into the powder-delivery injector 100, the main axis 60 of the jet-receiving nozzle 10 coincides with the delivery axis 160 of the powder-delivery injector 100.

Figure 6A:
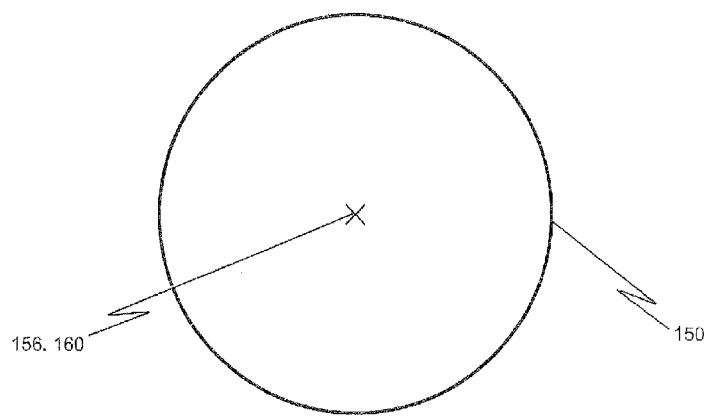

As shown in FIG. 6a, the center point 156 of a sectional circle 150 and said delivery axis 160 also coincide in the first channel region 120. The sectional circle 150 therefore describes the limit of the cross-sectional area of the accepting channel 140, which limit is obtained if a section taken perpendicularly with respect to the delivery axis 160 is carried out in the first channel region 120.

Figure 6B:
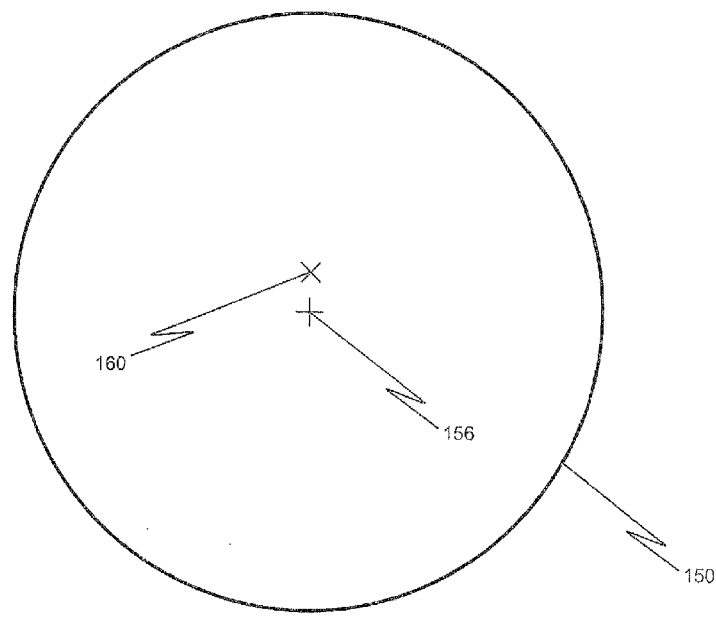

As is shown in FIG. 6b, given an analogously designed section, the center point 156 of the sectional circle 150 and the delivery axis 160 no longer coincide in the second channel region 121. It is thereby ensured that, by means of said conically oblique widening of the accepting channel, which takes place so as to complement the conically oblique widening of the arresting region 11 of the jet-receiving nozzle 10 according to the invention, the abovementioned jet-receiving nozzle 10 can be accepted by a powder-delivery injector formed in a matching manner thereto.

The invention is not restricted to the previously described exemplary embodiments but rather follows from an overall view of all of the features disclosed herein.

LIST OF REFERENCE NUMBERS

10 Jet-receiving nozzle
11 Arresting region of the jet-receiving nozzle
12 Connecting region of the jet-receiving nozzle
13 Inlet end of the arresting region
14 Transitional region
15 Inner surface
16 Outer surface
17 Guiding element
40 Jet-receiving channel
41 Axial center point of the jet-receiving channel
50 Outer sectional circle
51 Inner sectional circle
55 Center point of the inner sectional circle
56 Center point of the outer sectional circle
60 Main axis
100 Powder-delivery injector
120 First channel region
121 Second channel region
122 Accepting region
130 Powder supply channel
140 Accepting channel
150 Sectional circle
156 Center point of the sectional circle
160 Delivery axis
170 Conveying air connection
180 Connection for metering air
190 Insert opening for delivery-jet nozzle

The invention claimed is:

1. Jet-receiving nozzle for a powder-delivery injector with an arresting region on an injector side and a connecting region remote from the injector, the arresting region having an inlet end on the injector side and a transitional region opening out into the connecting region, the jet-receiving nozzle being formed as a hollow body with an inner surface and an outer surface, a jet-receiving channel for passing a powder-air mixture through being formed on the inner surface and corresponding in a line it follows in an axial direction to a line followed by a powder stream of the powder-air mixture that is passed through, and a main axis running through an axial center point of said channel,
wherein the arresting region widens in a obliquely conical manner from the inlet end in the direction of the transitional region in such a way that, in a section respectively taken perpendicularly with respect to the main axis at the inlet end, the center point of an outer sectional circle delimiting the cross-sectional area of the body on the outside coincides with the center point of an inner sectional circle delimiting the cross-sectional area of the jet-receiving channel, so that the main axis extends through this common center point, the center point of the outer sectional circle being displaced with respect to the main axis in the transitional region opening out into the connecting region such that the main axis does not extend through the center point of the outer sectional circle;
wherein the jet-receiving channel has a circular cross-section in both the arresting region and the transitional region of the jet-receiving nozzle; and wherein, in the transitional region of the jet-receiving nozzle, the cross-sectional area of the jet-receiving channel is the same as the cross-sectional area of the jet-receiving channel in the arresting region of the jet-receiving nozzle.

2. Jet-receiving nozzle according to claim 1, the jet-receiving nozzle having along the widening arresting region at least one guiding element which extends from the inlet end largely in a straight line in the direction of the connecting region.

3. Jet-receiving nozzle according to claim 1, the outer surface having a conductive coating.

4. Jet-receiving nozzle according to claim 1, the outer surface having encircling depressions formed as engaging grooves for the attachment of a conductive coating.

5. Jet-receiving nozzle according to claim 1, the jet-receiving nozzle having along the widening arresting region a plurality of guiding elements which extend from the inlet end largely in a straight line in the direction of the connecting region.

6. Jet-receiving nozzle according to claim 1, the het-receiving nozzle having along the widening arresting region three guiding elements, which extend from the inlet end largely in a straight line in the direction of the connecting region.

7. Jet-receiving nozzle according to claim 1, wherein the inner surface and the outer surface have axes of extension in the axial direction that diverge from the inlet towards the transition region.

8. Jet-receiving nozzle according to claim 1, wherein the inner surface and the outer surface are non-coaxial from an inlet region to the transition region.

9. Jet-receiving nozzle according to claim 1, wherein material forming the inner surface and material forming the outer surface have non-uniform thicknesses in the transition region.

10. Jet-receiving nozzle according to claim 1, wherein the inner surface and the outer surface are non-concentric at locations away from the inlet end.

11. Jet-receiving nozzle according to claim 1, wherein the inner surface and the outer surface are non-concentric from an inlet region to the transition region.

12. Jet-receiving nozzle according to claim 1, wherein the inner surface and the outer surface are non-concentric at the transition region.

13. Jet-receiving nozzle according to claim 1, wherein the inner surface and the outer surface constantly have circular cross sections from an inlet region to the transition region.

14. An assembly, comprising;
a powder-delivery injector including the jet-receiving nozzle according to claim 1.

15. Jet-receiving nozzle according to claim 1, the jet-receiving nozzle being configured to be inserted into a powder-delivery injector.

16. Jet-receiving nozzle according to claim 1, the jet-receiving nozzle having a generally elongate tubular configuration.

* * * * *